(12) United States Patent
Kursun

(10) Patent No.: US 10,805,297 B2
(45) Date of Patent: Oct. 13, 2020

(54) DYNAMIC MISAPPROPRIATION DECOMPOSITION VECTOR ASSESSMENT

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 256 days.

(21) Appl. No.: 15/916,876

(22) Filed: Mar. 9, 2018

(65) Prior Publication Data

US 2019/0281056 A1 Sep. 12, 2019

(51) Int. Cl.
| | |
|---|---|
| *H04L 29/06* | (2006.01) |
| *G06F 21/31* | (2013.01) |
| *G06N 3/02* | (2006.01) |
| *G06F 21/62* | (2013.01) |
| *H04L 12/24* | (2006.01) |

(52) U.S. Cl.
CPC .......... *H04L 63/0892* (2013.01); *G06F 21/31* (2013.01); *G06F 21/6218* (2013.01); *G06N 3/02* (2013.01); *H04L 41/145* (2013.01); *H04L 63/10* (2013.01)

(58) Field of Classification Search
CPC ................................. H04L 63/14; G06F 21/56
See application file for complete search history.

(56) References Cited

U.S. PATENT DOCUMENTS

| | | | |
|---|---|---|---|
| 5,224,173 A | 6/1993 | Kuhns et al. | |
| 5,276,772 A | 1/1994 | Wang et al. | |
| 5,325,466 A | 6/1994 | Kornacker | |
| 5,359,699 A | 10/1994 | Tong et al. | |
| 5,577,169 A | 11/1996 | Prezioso | |
| 5,819,226 A | 10/1998 | Gopinathan et al. | |
| 5,822,741 A | 10/1998 | Fischthal | |
| 6,330,546 B1 | 12/2001 | Gopinathan et al. | |
| 8,245,282 B1 | 8/2012 | Buckwalter et al. | |
| 9,098,852 B1 | 8/2015 | Dangott et al. | |
| 9,306,962 B1* | 4/2016 | Pinto | H04L 63/1416 |
| 2002/0161711 A1 | 10/2002 | Sartor et al. | |
| 2007/0106582 A1 | 5/2007 | Baker et al. | |
| 2007/0121596 A1 | 5/2007 | Kurapati et al. | |

(Continued)

*Primary Examiner* — Jason K Gee
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for identification of normal state authenticity indicators for user authentication into applications in real-time to prevent misappropriation at the point of authenticity. In this way, the system provides decomposition of streaming transactions through a matrix of engines giving the system the ability to profile different characteristics of streaming data. Furthermore, providing strategies to respond based on the output of the decomposition. As such, requests for identification, authentication, or access to secure locations along with historical data through multiple vectors that are specialized in specific misappropriation identification to output a complete misappropriation profile from the vectors for recommended actions for the authenticity of the user. The results from each engine are cross compared to generate a complete misappropriation profile that covers a range of factors for the input.

14 Claims, 4 Drawing Sheets

(56) References Cited

U.S. PATENT DOCUMENTS

| | | |
|---|---|---|
| 2007/0124256 A1 | 5/2007 | Crooks et al. |
| 2010/0235908 A1 | 9/2010 | Eynon et al. |
| 2011/0055078 A1 | 3/2011 | Nandy |
| 2014/0122325 A1 | 5/2014 | Zoldi et al. |
| 2014/0289867 A1 | 9/2014 | Bukai |
| 2015/0186901 A1 | 7/2015 | Miltonberger |
| 2015/0363783 A1 | 12/2015 | Ronca et al. |
| 2016/0012235 A1* | 1/2016 | Lee .................. G06K 9/00442 726/25 |
| 2016/0300049 A1* | 10/2016 | Guedalia ............ G06K 9/6272 |
| 2017/0148024 A1 | 5/2017 | Yu et al. |
| 2017/0148027 A1 | 5/2017 | Yu et al. |

\* cited by examiner

DYNAMIC MISAPPROPRIATION DECOMPOSITION VECTOR ASSESSMENT

BACKGROUND

Determination of authenticity of individuals for security applications is currently a post distribution determination of authenticity that rely on artificial intelligence and machine learning algorithms. However, variations in user event history makes it challenging for these approaches to accurately identify users for these applications. Accordingly, there is a need for a way to efficiently and effectively identify authenticity of individuals or entities in real-time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Determining the authenticity of users for application can be challenging as users have wide ranges of diversity in resource distribution patterns, health care, data points, interactions, transactions over time, and the like. The system utilizes a dynamic hierarchical learning engine matrix to identify user authenticity in real-time.

In this way, the system may utilize multiple processes for identification of authentic identification request to prevent misappropriation at the point of interaction. In some embodiments, the system utilizes learning engine cross training for authenticity identification.

In some embodiments, the system provides decomposition of streaming transactions through a collection (vector, matrix or other organization) of engines. This gives the full system the ability to profile different characteristics of the streaming data. Furthermore, providing strategies to respond based on the output of the decomposition.

The learning engine cross training transmits requests for identification, authentication, or access to secure locations along with historical data through multiple vectors that are specialized in specific misappropriation identification to output a complete misappropriation profile from the vectors for recommended actions for the authenticity of the user. Each learning engine may comprise a neural engine within the system is trained for misappropriation, non-misappropriation, and the like. The results from each engine are cross compared to generate a complete misappropriation profile that covers a range of factors for the input.

Embodiments of the invention relate to systems, methods, and computer program products for real-time authenticity identification of a user, the invention comprising: generating an authenticity identification procedure, wherein the authenticity identification procedure comprise one or more learning network engines and learning network engine controllers for vector decomposition analysis of real-time streaming data; identifying an authenticity request as being initiated and convert the authenticity request to real-time streaming data, wherein the authenticity request is for authentication, identification, or access to a secure application; streaming data from the authenticity request through vectors of the one or more learning network engines; consolidating a vector output through the one or more learning network engines to generate an overall misappropriation vector; combining the overall misappropriation vector with potential loss as a vector for an overall misappropriation profile; and generating an action recommendation for the real-time streaming data.

In some embodiments, the invention further comprises generating an authenticity identification procedure further comprises identifying historic normal data and historic misappropriation data and decomposing the historic normal data and historic misappropriation data. In some embodiments, decomposing historic misappropriation data further comprises decomposing the historic misappropriation data into single misappropriation types and coding one of the one or more learning network engines specifically for identification of a single misappropriation type. In some embodiments, decomposing historic normal data further comprises decomposing the historic normal data into single normal transaction types and coding one of the one or more learning network engines specifically for identification of a single normal transaction type.

In some embodiments, the one or more learning network engines comprise one or more hybrid and/or ensemble neural networks, a collection of machine learning engines, and/or a collection of artificial intelligence engines.

In some embodiments, generating an action recommendation for the real-time streaming data further comprises optimize, dynamically, the one or more learning network engines by modification of the learning network engine controllers with one or more layering or patterning of historic data.

In some embodiments, the overall misappropriation vector further comprises a consolidation of vector outputs from the one or more learning network engines including one or more learning network engines specifically for identification of a single misappropriation type and one or more learning network engines specifically for identification of a single normal transaction type.

In some embodiments, the overall misappropriation profile further comprises historic resource distribution attributes, merchant specific attributes, event sequenced attributes, loss data, individual data, and misappropriated transaction data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
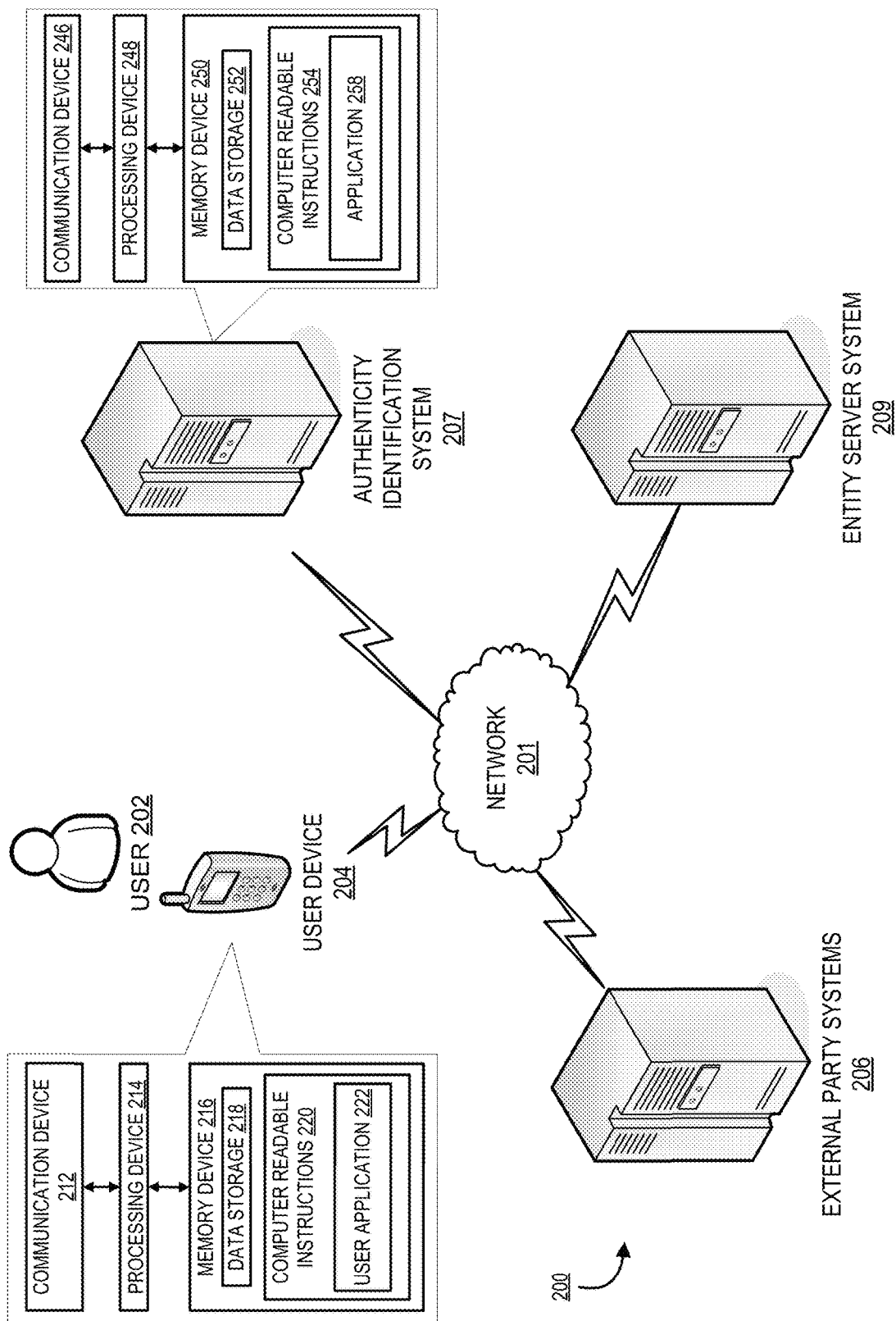
Figure 2:
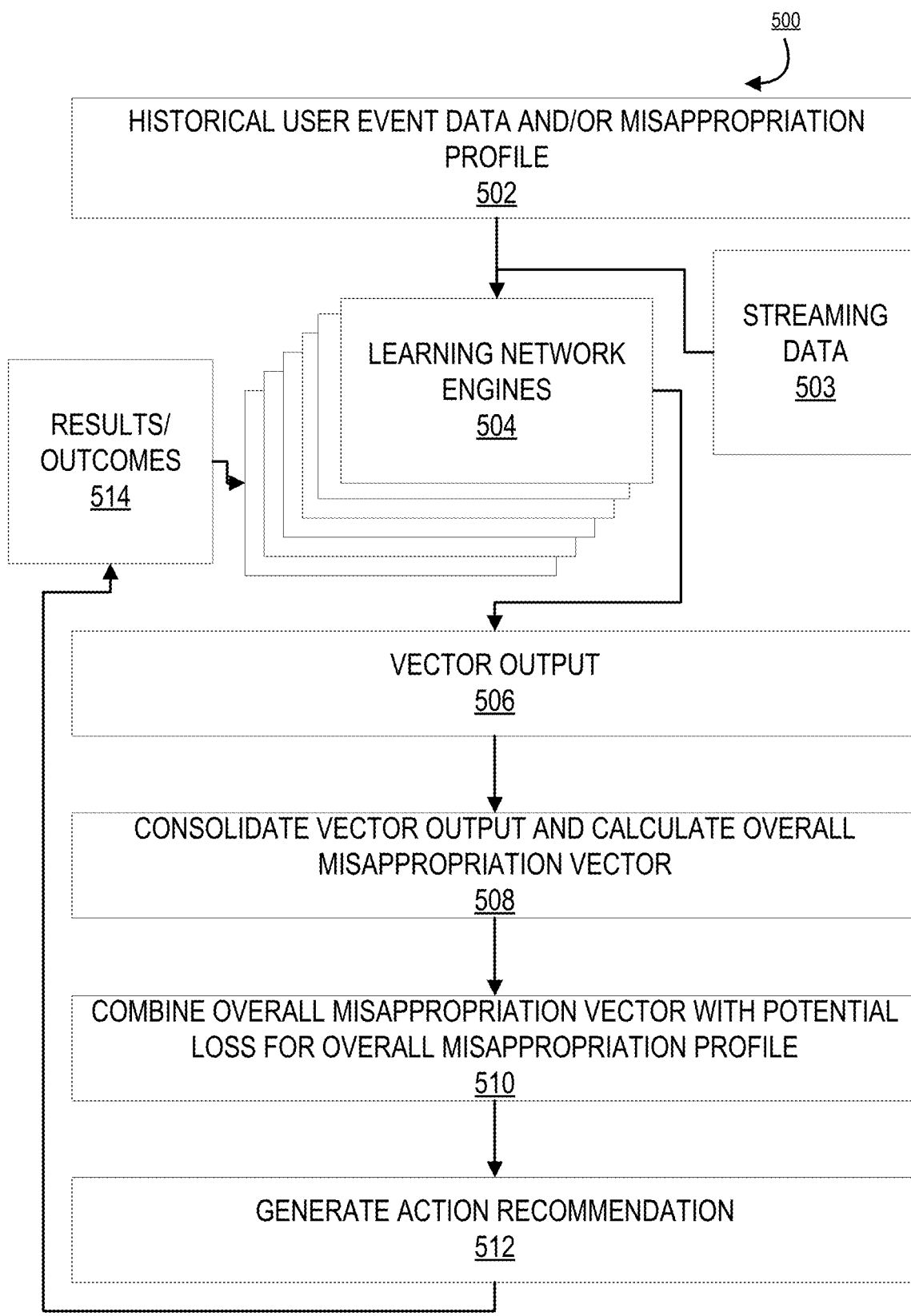
Figure 3:
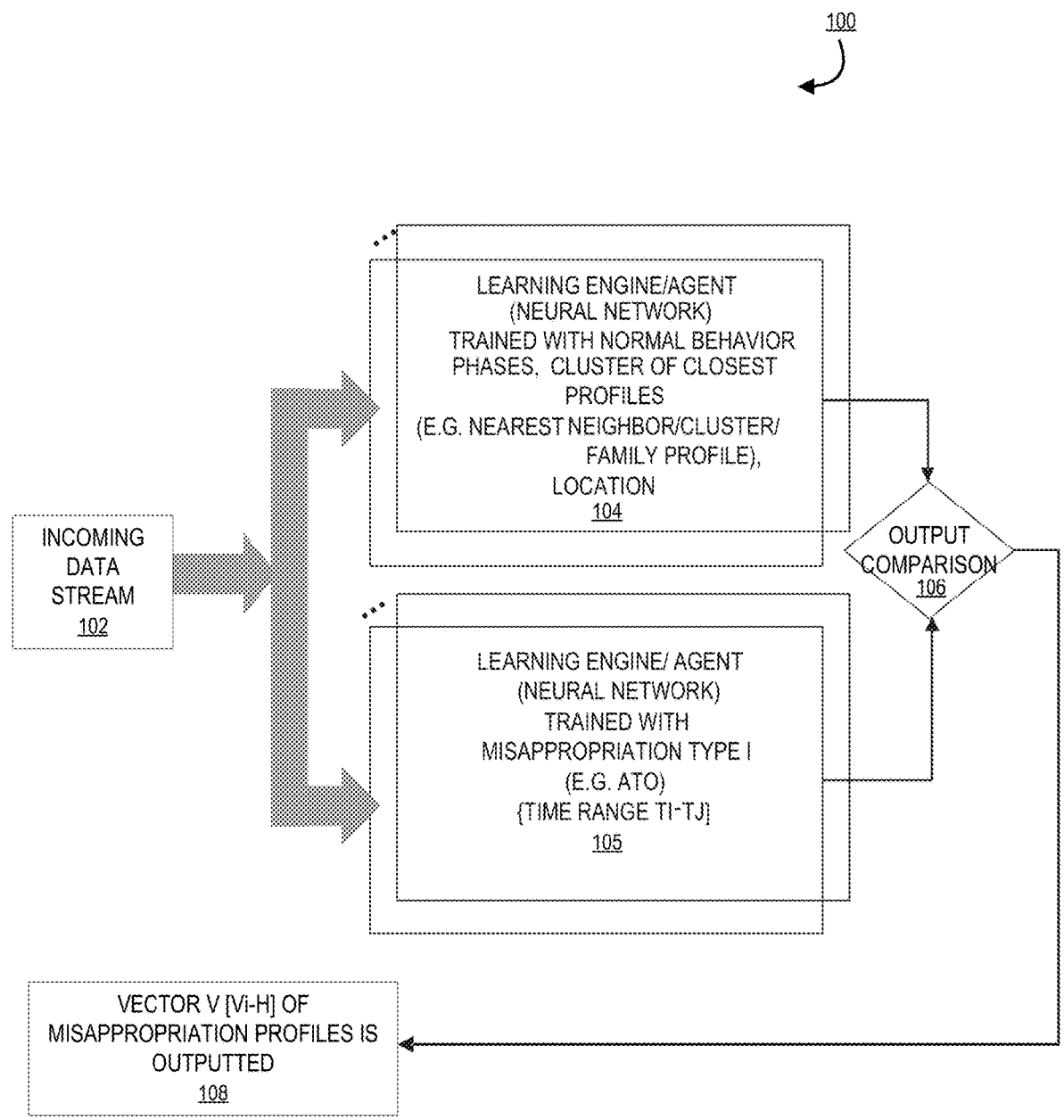
Figure 4:
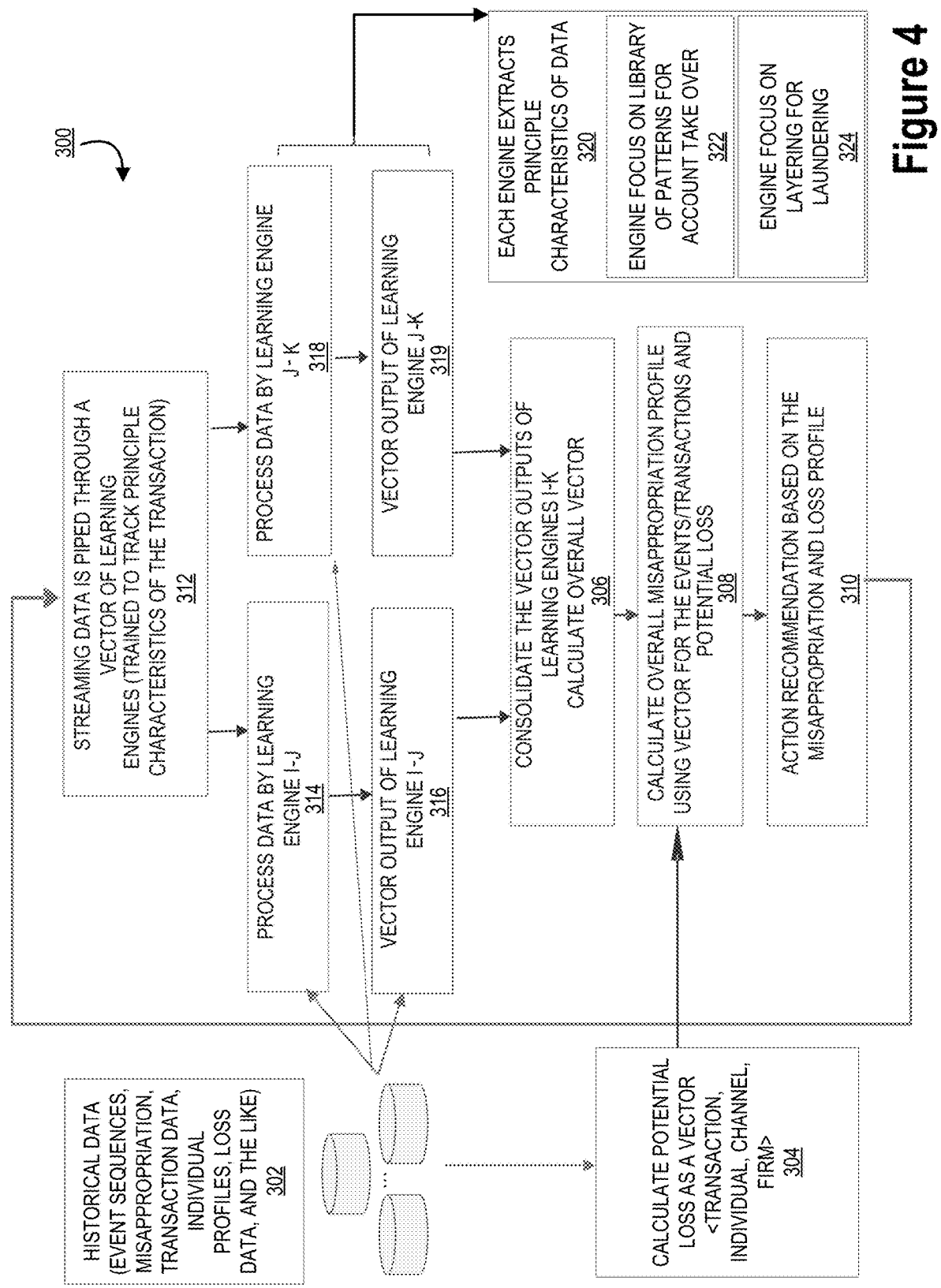

Having thus described embodiments of the invention in general terms, reference will now be made to the accompanying drawings, where:

FIG. 1 illustrates a dynamic misappropriation decomposition vector system environment, in accordance with embodiments of the present invention;

FIG. 2 illustrates a flowchart for learning engine cross training for authenticity identification, in accordance with embodiments of the present invention;

FIG. 3 illustrates a high level flowchart of a vector profile, in accordance with embodiments of the present invention; and FIG. 4 illustrates an overview of misappropriation vector assessment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" may be a financial institution, business, insurance provider, health care provider, education institution, or the like that may include requiring identification of individuals for services/processes within the entity. Furthermore, an entity may include a merchant device, automated teller machine (ATM), entity device, or the like. For the purposes of this invention, a "communication" or a "user communication" may be any digital or electronic transmission of data, metadata, files, or the like. The communication may be originated by an individual, application, system within an entity. Furthermore, an "external party" may be one or more individuals, entities, systems, servers, or the like external to the entity. This may include third parties, partners, subsidiaries, or the like of the entity. A resource distribution, as used herein may be any transaction, property transfer, service transfer, payment, or another distributions from the user. A resource distribution may further include user authentications, locations, device usages, and the like. In some embodiments, event history may include historic resource distributions, user interactions, events the user, habits for the user, or the like.

In some embodiments, the system utilizes learning engine cross training for authenticity identification. The learning engine cross training transmits requests for identification, authentication, or access to secure locations along with historical data through multiple vectors that are specialized in specific misappropriation identification to output a complete misappropriation profile from the vectors for recommended actions for the authenticity of the user. Each learning engine may comprise a neural engine within the system is trained for misappropriation, non-misappropriation, and the like. The results from each engine are cross compared to generate a complete misappropriation profile that covers a range of factors for the input.

FIG. 1 illustrates a dynamic misappropriation decomposition vector system environment 200, in accordance with embodiments of the present invention. FIG. 1 provides the system environment 200 for which the distributive network system with specialized data feeds for extract information for information security vulnerability assessments for the user. FIG. 1 provides a unique system that includes specialized servers and system communicably linked across a distributive network of nodes required to perform the functions for authenticity identification.

As illustrated in FIG. 1, the authenticity identification system 207 is operatively coupled, via a network 201 to the user device 204, the entity server system 209, and to the external party systems 206. In this way, the authenticity identification system 207 can send information to and receive information from the user device 204, entity server system 209, and the external party systems 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals or entities. In this way, the user 202 may be any individual or entity requesting access to one or more locations within an application, entity, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the external party systems 206, entity server system 209, and the authenticity identification system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

As further illustrated in FIG. 1, the authenticity identification system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the external party systems 206, entity server system 209, and the user device 204. As such, the communication device 246 generally comprises a modem, server, or other device for communicating with other devices on the network 201.

As further illustrated in FIG. 1, the authenticity identification system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the authenticity identification system 207 the memory device 250 stores an application 258. Furthermore, the authenticity identification system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more of the entity server system 209 and/or user device 204.

In some embodiments, the user 202 may be utilizing the user device 204 to generate a communication. The communication may be a digital or electronic communication such as email, text message, or the like. The communication may further include information such as data, files, metadata, or the like associated with the user or the entity. The communication may be initiated by the user 202 with the desired receiver of the communication being an individual outside the entity and associated with an external party system 206. Upon generation of the communication, the user may attempt to send the communication with the information to the external party. The authenticity identification system 207 recognizes the generation of the communication and performs a vulnerability assessment of the communication to approve the communication for a permit to send. The vulnerability assessment may be an evaluation process that is built into the entity server system 209 that evaluates the security of the data in the communication prior to being transmitted.

The authenticity identification system 207 may operate to perform the authenticity identification processes. In some embodiments, the authenticity identification system 207 may perform hierarchical learning of data and event history modeling to identify normal resource distribution of a user, interactions, events, habits, or the like. In this way, in some embodiments, the authenticity identification system 207 may perform phase-based characterization of interactions and resource distribution for authenticity identification. In some embodiments, the authenticity identification system 207 may perform a collective profile operation across channels for authenticity identification. In some embodiments, the authenticity identification system 207 may perform learning engine cross training for authenticity identification. In some embodiments, the authenticity identification system 207 may perform hierarchical learning profile optimization for authenticity identification. In some embodiments, the authenticity identification system 207 may perform one or more of these functions to perform authenticity identification using dynamic hierarchical learning.

As illustrated in FIG. 1, the entity server system 209 is connected to the authenticity identification system 207, user device 204, and external party systems 206. The entity server system 209 has the same or similar components as described above with respect to the user device 204 and authenticity identification system 207. The entity server system 209 may be the main system server for the entity housing the entity email, data, documents, and the like. The entity server system 209 may also include the servers and network mainframe required for the entity.

It is understood that the servers, systems, and devices described herein illustrate one embodiment of the invention. It is further understood that one or more of the servers, systems, and devices can be combined in other embodiments and still function in the same or similar way as the embodiments described herein.

In some embodiments, the system provides decomposition of streaming transactions through a collection (vector, matrix or other organization) of engines. This gives the full system the ability to profile different characteristics of the streaming data. Furthermore, providing strategies to respond based on the output of the decomposition.

In some embodiments, user historical event history attributes are identified. These may be transaction attributes or non-transaction attributes. The event history attributes may include user's behavior, transaction history, resource distribution habits, geographic location, tendencies, passwords, and the like. The attributes are compiled for the user for authenticity identification. Upon indication of a required identification of a user for authentication, the system may trigger an authenticity identification process for confirmation in real-time for identification of normality or standard event history patterning of the user for identification of authenticity of authentication, identification, or access to secure locations or confirm resource distributions in real-time to prevent misappropriation.

Using the one or more authenticity identification procedures, the system may confirm authorization of the user. As such, the system may determine if the authentication, identification, or access to a secure location should be granted to the individual or entity requesting access. If not, the authenticity identification procedures will identify that the user did not authorize the access and deny access.

In some embodiments, the authenticity identification includes learning engine cross training for authenticity identification. The learning engine cross training transmits requests for identification, authentication, or access to secure locations along with historical data through multiple vectors that are specialized in specific misappropriation identification to output a complete misappropriation profile from the vectors for recommended actions for the authenticity of the user. Each learning engine may comprise a neural engine within the system is trained for misappropriation, non-misappropriation, and the like. The results from each engine are cross compared to generate a complete misappropriation profile that covers a range of factors for the input.

In some embodiments, the authenticity identification includes phase characterization. In this way, the system identifies patters in user event history that leads to identification of phases of a user life. The user patterns may change from life events, over recurring periods, geographic locations, resource distributions, and the like that make it challenging to identify a normal profile for the user due to the divergence in the patterns. However, the system may utilize the divergences to identify unique patters and in turn phases of a user and extract those phases with a consistence and predictability. The system using phase characterization 104 identifies patterns of a user over time. These patterns can include repetitive or non-repetitive patterns. The system performs patterning by creation of profiles for the user that identify cross-channel patterns that uniquely identify user event history. In some embodiments, the system utilizes Bayesian belief networks, time series analysis, learning engines, and the like for creating an accurate profile. These patterns may include misappropriation aversion, interaction patterns during the day, budget consciousness, resource distribution patterns, overall divergence, resource distribution, geographic behavior, and predictability patterning of historic user actions. The patterns are then clustered together into phases of a user.

In some embodiments, the authenticity identification includes a collective profile operation across channels. As illustrated, the authenticity identification of collective profile operation across channels comprises a collection of profile engines running in parallel. The profile engines collaborate with each other as they profile different aspects of the data as well as detecting any anomalies within the data. The profiles may be across resource distributions, transactions, authentication profiles of the user, geographical locations, devices, or the like. The collective of profiles may perform security tracking across all of the known channels to compare the profiles against known misappropriations.

FIG. 2 illustrates a flowchart for learning engine cross training for authenticity identification 500, in accordance with embodiments of the present invention. In this way, one of the authenticity identification includes learning engine cross training for authenticity identification. The learning engine cross training transmits new authenticity requests, event history, and other historical data through multiple vectors that are specialized in specific misappropriation identification to output a complete misappropriation profile from the vectors for recommended actions. The learning engines may be based on neural networks, machine learning technologies, and/or other AI algorithms.

As illustrated in block 502, the process 500 is initiated by extracting historical user event data and/or misappropriation profiles. The historic resource distribution attributes may be user specific, merchant specific, event sequenced, or the like. The misappropriation profiles may include loss data, individual data, misappropriated transaction data, or the like. The historical data of the user attributes for triggering of a vector output in specific misappropriation segments.

Streaming data, as illustrated in block 503 comprises initiated transaction or resource distribution of a user for authenticity identification. The streaming data along with the historical data of the resource distribution attributes and/or the misappropriation profiles is streamed into the neural network engines, as illustrated in block 504.

The streaming data is passed through a vector of learning network engines that are trained for various different aspects of misappropriation. These learning network engines may be based on neural networks, ensemble of neural networks, hybrids, machine learning, or the like. The learning network engines are trained for misappropriation identification and/or normal action identification and cross comparison of results to output a misappropriation vector for recommendation actions. The neural network engines may include misappropriation identification and normal action identification within various sectors such as location, phases, neighborhoods, families, various misappropriation types such as client segments, account takeover characteristics, emerging misappropriation, and the like.

Once the streaming data is passed through the vector of learning network engines, the vector provides an output, as illustrated in block 506. The output illustrates each of the engines calculation of misappropriation for each individual aspect that the specific engine was reviewing. Those output calculations are then consolidated and an overall misappropriation vector is generated for the inputted streaming data, as illustrated in block 508.

The overall misappropriation vector may then be consolidated with the potential loss identified for the data into an overall misappropriation profile, as illustrated in block 510. The overall misappropriation profile may be utilized to identify the overall misappropriation the authenticity request may have. This overall misappropriation allows the system to generate an action recommendation for the authenticity request, as illustrated in block 512. The action may include an allowance, denial, tracking, or the like of the input authenticity request. The results/outcomes from the action generated is then piped back into the learning network engines, as illustrated in block 514. This piping allows for the learning network engines to continue to perform machine learning and refine the vector outputs for future data streams.

FIG. 3 illustrates a high level flowchart of a vector profile operation 100, in accordance with embodiments of the present invention. As illustrated in block 102, streaming incoming data is passed through a vector of neural networks trained for various different aspects of transactions. The incoming data stream may be one or more transactions, requests for authentication, payments, or the like. The streaming data is passed through a vector of neural networks each individually trained for identification of various types or aspects of a transaction to identify potential misappropriation. The neural engines (networks/systems) are trained for misappropriation pathways and non-misappropriation pathways. As illustrated in block 104, the learning engines/agents (or neural networks) are trained with normal behavior phases, clusters of closest profiles, or the like. These are non-misappropriation pathways.

In some embodiments, normal behavior phases includes normal transactional behavior of a user. As such, the system identifies patters in user event history that leads to identification of phases of a user life. The user patterns may change from life events, over recurring periods, geographic locations, resource distributions, and the like that make it challenging to identify a normal profile for the user due to the divergence in the patterns. However, the system may utilize the divergences to identify unique patters and in turn phases of a user and extract those phases with a consistence and predictability. The system using phase characterization identifies patterns of a user over time. These patterns can include repetitive or non-repetitive patterns. The system performs patterning by creation of profiles for the user that identify cross-channel patterns that uniquely identify user event history. In some embodiments, the system utilizes Bayesian belief networks, time series analysis, learning engines, and the like for creating an accurate profile. These patterns may include misappropriation aversion, interaction patterns during the day, budget consciousness, resource distribution patterns, overall divergence, resource distribution, geographic behavior, and predictability patterning of historic user actions. The patterns are then clustered together into phases of a user.

In some embodiments, clusters of closest profiles includes identification and optimization of clusters closely related accounts from one or more related users, such as friends, family members, or the like to identify abnormal resource distributions for a user that may potentially be normal for one or more other individuals within the cluster. The system distinguishes one or more different levels of clusters for a user which triggers varying levels of normality of resource distributions for a cluster.

As illustrated in block 105, the learning engine/agent (neural network) may be trained with one or more types of misappropriations. For example, as illustrated in block 105, the learning engine is trained with misappropriation type I (which includes ATO within a time range). The neural network engines may include misappropriation identification and normal action identification within various sectors such as location, phases, neighborhoods, families, various misappropriation types such as client segments, account takeover characteristics, emerging misappropriation, and the like.

In some embodiments, a single neural network exists in block 104. In some embodiments, multiple neural networks exists in block 104. In some embodiments, a single neural network exists in block 105. In some embodiments, multiple neural network exists in block 105. In some embodiments, the system performs a cross comparison of the results to output misappropriation vector, as illustrated in block 106. This comparison is for individual misappropriation profiles and expectation profiles for a range of factors.

In some embodiments, normal profile operation paths, as illustrated in block 104, may further comprise, for example, neural network/system 1 that is trained purely on misappropriation data for client segments, neural network/system 2 trained for account takeover characteristics, neural network/system 3 trained for window of emerging/latest misappropriation pattern identification. In some embodiments, the learning engines of block 104 may comprise one or more of the neural network/systems as disclosed above. In some embodiments, the learning engines of block 104 may comprise additional neural network/systems than those disclosed above.

In some embodiments, misappropriation profile operation paths, as illustrated in block 105, may further comprise, for example, neural network/system A, trained on phase behavior of client segments, neural network/system B trained on closest correlation profiles such as close friends, family members, or the like. As illustrated in block 108, the process 100 continues by Vector V of the misappropriation profiles is outputted.

FIG. 4 illustrates an overview of misappropriation vector assessment 300, in accordance with embodiments of the present invention. As illustrated in block 302, the process 300 is initiated by accessing historical data such as event sequences, misappropriation data, transaction data, individual profiles of the users, loss data, and the like. The data is then utilized to generation various learning engines. In some embodiments, these learning engines include learning engines I-J, as illustrated in block 314. In some embodiments, the learning engines include J-K, as illustrated in block 318.

As illustrated in block 312, streaming data is piped through the vector of learning engines. These learning engines used the historic data to be trained to track principle characteristics of the transaction to identify misappropriation. The streaming data includes real-time data surrounding the characteristics of a transaction occurring. The streaming data may be processed through one or both learning engines I-J and learning engines J-L.

As illustrated, each learning engine block 314 and 318, may generate a vector output of the learning engine. As illustrated in block 316, the vector output of learning engine I-J is generated. As illustrated in block 319, the vector output of learning engine J-K is generated.

As illustrated in block 320, each engine extracts principle characteristics of data. In some embodiments, one or more of the engines may focus on library of patterns, as illustrated in block 322. These libraries of patterns may identify account takeover patterning, normal patterning, varying misappropriation patterning, or the like. In other embodiments, the engines may focus on layering of data, as illustrated in block 324. In some embodiments, the layering of data may layer one or more different data points to identify misappropriation such as laundering, or the like.

The vector outputs from block 316 and 319 are consolidated of learning engines I-K to calculate an overall vector for the data inputted, as illustrated in block 306. As illustrated in block 308, the process 300 continues by calculating the overall misappropriation profile using the vector for the events/transactions and potential loss. Referring back to block 304, the system uses the historical data from block 302 to further calculate a potential loss as a vector, such as transaction, individual, channel, firm, or the like. This along with the overall vector are used to calculate the overall misappropriation profile in block 308.

As illustrated in block 310, the process 300 continues by identifying and providing an action recommendation based on the misappropriation and loss profile. The action recommendation is then transmitted back to block 312 to process the action as streamed data to process the action through the vectors to identify any potential issues or misappropriations within the action.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authentication and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time authenticity identification of a user, the system comprising:
a controller for dynamically performing modeling and reasoning for authenticity identification of the user, the controller comprising one or more memory devices with computer-readable program code stored thereon, one or more communication devices connected to a network, and one or more processing devices, wherein the one or more processing devices are configured to execute the computer-readable program code to:
generate an authenticity identification procedure, wherein the authenticity identification procedure comprise one or more learning network engines and learning network engine controllers for vector decomposition analysis of real-time streaming data;
decompose historic normal data and historic misappropriation data, wherein decomposing historic normal data comprises decomposing the historic normal data into single normal transaction types and coding one of the one or more learning network engines specifically for identification of a single normal transaction type and wherein decomposing the historic misappropriation data into single misappropriation types and coding one of the one or more learning network engines specifically for identification of a single misappropriation type;
identify an authenticity request as being initiated and convert the authenticity request to real-time streaming data, wherein the authenticity request is for authentication, identification, and access to a secure application;
stream data from the authenticity request through vectors of the one or more learning network engines, wherein the vectors of the one or more learning network engines extract data in a form of principle characteristics based on a library of patterns;
layer the extracted data as principle characteristics to identify misappropriation;
consolidate a vector output through the one or more learning network engines to generate an overall misappropriation vector;
combine the overall misappropriation vector with potential loss as a vector for an overall misappropriation profile; and
generate an action recommendation for the real-time streaming data.

2. The system of claim 1, wherein generating an authenticity identification procedure further comprises identifying historic normal data and historic misappropriation data.

3. The system of claim 1, wherein the one or more learning network engines comprise one or more hybrid and/or ensemble neural networks, a collection of machine learning engines, and/or a collection of artificial intelligence engines.

4. The system of claim 1, wherein generating an action recommendation for the real-time streaming data further comprises optimize, dynamically, the one or more learning network engines by modification of the learning network engine controllers with one or more layering or patterning of historic data.

5. The system of claim 1, wherein the overall misappropriation vector further comprises a consolidation of vector outputs from the one or more learning network engines including one or more learning network engines specifically for identification of a single misappropriation type and one or more learning network engines specifically for identification of a single normal transaction type.

6. The system of claim 1, wherein the overall misappropriation profile further comprises historic resource distribution attributes, merchant specific attributes, event sequenced attributes, loss data, individual data, and misappropriated transaction data.

7. A system for real-time authenticity identification of a user, the system comprising:
a controller for dynamically performing modeling and reasoning for authenticity identification of the user, the controller comprising one or more memory devices with computer-readable program code stored thereon, one or more communication devices connected to a network, and one or more processing devices, wherein the one or more processing devices are configured to execute the computer-readable program code to:
generate an authenticity identification procedure, wherein the authenticity identification procedure comprise one or more learning network engines and learning network engine controllers for vector decomposition analysis of real-time streaming data;
decompose historic normal data and historic misappropriation data, wherein decomposing historic normal data comprises decomposing the historic normal data into single normal transaction types and coding one of the one or more learning network engines specifically for identification of a single normal transaction type and wherein decomposing the historic misappropriation data into single misappropriation types and coding one of the one or more learning network engines specifically for identification of a single misappropriation type;
identify an authenticity request as being initiated and convert the authenticity request to real-time streaming data, wherein the authenticity request is for authentication, identification, and access to a secure application;
stream data from the authenticity request through vectors of the one or more learning network engines, wherein the vectors of the one or more learning network engines extract data in a form of principle characteristics based on a library of patterns;
layer the extracted data as principle characteristics to identify misappropriation; and
consolidate a vector output through the one or more learning network engines to generate an overall misappropriation vector.

8. The system of claim 7, further comprising generating an action recommendation for the real-time streaming data, wherein generating an action recommendation for the real-time streaming data further comprises optimize, dynamically, the one or more learning network engines by modification of the learning network engine controllers with one or more layering or patterning of historic data.

9. A computer-implemented method for real-time authenticity identification of a user, the method comprising:
providing a controller comprising a computer processing device and a non-transitory computer readable medium, where the computer readable medium comprises configured computer program instruction code, such that when said instruction code is operated by said computer processing device, said computer processing device performs the following operations:
generate an authenticity identification procedure, wherein the authenticity identification procedure comprise one or more learning network engines and learning network engine controllers for vector decomposition analysis of real-time streaming data;
decompose historic normal data and historic misappropriation data, wherein decomposing historic normal data comprises decomposing the historic normal data into single normal transaction types and coding one of the one or more learning network engines specifically for identification of a single normal transaction type and wherein decomposing the historic misappropriation data into single misappropriation types and coding one of the one or more learning network engines specifically for identification of a single misappropriation type;
identify an authenticity request as being initiated and convert the authenticity request to real-time streaming data, wherein the authenticity request is for authentication, identification, and access to a secure application;
stream data from the authenticity request through vectors of the one or more learning network engines, wherein the vectors of the one or more learning network engines extract data in a form of principle characteristics based on a library of patterns;
layer the extracted data as principle characteristics to identify misappropriation;
consolidate a vector output through the one or more learning network engines to generate an overall misappropriation vector;
combine the overall misappropriation vector with potential loss as a vector for an overall misappropriation profile; and
generate an action recommendation for the real-time streaming data.

10. The computer-implemented method of claim 9, wherein generating an authenticity identification procedure further comprises identifying historic normal data and historic misappropriation data.

11. The computer-implemented method of claim 9, wherein the one or more learning network engines comprise one or more hybrid and/or ensemble neural networks, a collection of machine learning engines, and/or a collection of artificial intelligence engines.

12. The computer-implemented method of claim 9, wherein generating an action recommendation for the real-time streaming data further comprises optimize, dynamically, the one or more learning network engines by modification of the learning network engine controllers with one or more layering or patterning of historic data.

13. The computer-implemented method of claim 9, wherein the overall misappropriation vector further comprises a consolidation of vector outputs from the one or more learning network engines including
one or more learning network engines specifically for identification of a single misappropriation type and one or more learning network engines specifically for identification of a single normal transaction type.

14. The computer-implemented method of claim 9, wherein the overall misappropriation profile further comprises historic resource distribution attributes, merchant specific attributes, event sequenced attributes, loss data, individual data, and misappropriated transaction data.

\* \* \* \* \*